US010564856B2

(12) United States Patent
Li et al.

(10) Patent No.: US 10,564,856 B2
(45) Date of Patent: Feb. 18, 2020

(54) METHOD AND SYSTEM FOR MITIGATING WRITE AMPLIFICATION IN A PHASE CHANGE MEMORY-BASED STORAGE DEVICE

(71) Applicant: Alibaba Group Holding Limited, George Town, Grand Cayman (KY)

(72) Inventors: Shu Li, Bothell, WA (US); Ping Zhou, Folsom, CA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/643,210

(22) Filed: Jul. 6, 2017

(65) Prior Publication Data

US 2019/0012111 A1    Jan. 10, 2019

(51) Int. Cl.
    G06F 3/06    (2006.01)
    G06F 12/02   (2006.01)
(52) U.S. Cl.
    CPC ............ *G06F 3/0613* (2013.01); *G06F 3/061* (2013.01); *G06F 3/0619* (2013.01); *G06F 3/0638* (2013.01); *G06F 3/0655* (2013.01); *G06F 3/0679* (2013.01); *G06F 3/0685* (2013.01); *G06F 12/0246* (2013.01)
(58) Field of Classification Search
    CPC ...... G06F 3/0655; G06F 3/0656; G06F 3/061; G06F 3/0613; G06F 3/0619; G06F 3/0638; G06F 12/0246; G06F 3/0679; G06F 3/068; G06F 3/0685
    USPC .......................................... 711/102, 103, 104
    See application file for complete search history.

(56) References Cited

U.S. PATENT DOCUMENTS

| | | | |
|---|---|---|---|
| 4,775,932 A | | 10/1988 | Oxley |
| 5,557,767 A | * | 9/1996 | Sukegawa ........... G06F 12/0862 711/113 |
| 5,559,952 A | * | 9/1996 | Fujimoto ............ G06F 12/0875 345/531 |
| 5,875,458 A | * | 2/1999 | Niijima ................. G06F 3/0601 710/27 |
| 6,226,650 B1 | | 5/2001 | Mahajan et al. |
| 7,565,454 B2 | | 7/2009 | Zuberi |
| 8,260,924 B2 | | 9/2012 | Koretz |
| 8,452,819 B1 | | 5/2013 | Sorenson, III et al. |
| 8,516,284 B2 | | 8/2013 | Chan |

(Continued)

FOREIGN PATENT DOCUMENTS

WO       1994018634       8/1994

OTHER PUBLICATIONS

Write Amplification Analysis in Flash-Based Solid State Drives by Hu (Year: 2009).*

(Continued)

*Primary Examiner* — Paul M Knight
(74) *Attorney, Agent, or Firm* — Shun Yao; Park, Vaughan, Fleming & Dowler LLP

(57) ABSTRACT

One embodiment facilitates mitigating write amplification in a phase change memory-based storage device. During operation, the system receives, by a controller of the storage device, data to be stored in a phase change memory (PCM) of the storage device. The system writes, by the controller, the data to a sector of a volatile memory of the same storage device to obtain an updated portion of the sector. In response to detecting a predetermined condition, the system writes the updated portion to the PCM.

18 Claims, 11 Drawing Sheets

(56) References Cited

U.S. PATENT DOCUMENTS

| | | | |
|---|---|---|---|
| 8,825,937 B2* | 9/2014 | Atkisson | G06F 12/0246 711/102 |
| 9,043,545 B2 | 5/2015 | Kimmel | |
| 9,092,223 B1 | 7/2015 | Pani | |
| 9,280,472 B1* | 3/2016 | Dang | G06F 12/0871 |
| 9,588,698 B1 | 3/2017 | Karamcheti | |
| 9,588,977 B1 | 3/2017 | Wang | |
| 2002/0010783 A1 | 1/2002 | Primak | |
| 2002/0161890 A1 | 10/2002 | Chen | |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0177755 A1 | 8/2005 | Fung | |
| 2005/0195635 A1 | 9/2005 | Conley | |
| 2005/0235067 A1* | 10/2005 | Creta | G06F 13/4027 710/5 |
| 2005/0235171 A1 | 10/2005 | Igari | |
| 2006/0156012 A1 | 7/2006 | Beeson | |
| 2007/0033323 A1 | 2/2007 | Gorobets | |
| 2007/0101096 A1* | 5/2007 | Gorobets | G06F 12/0246 711/203 |
| 2007/0255891 A1* | 11/2007 | Chow | G06F 12/0804 711/103 |
| 2008/0104444 A1* | 5/2008 | Kojima | G06F 11/1088 714/6.2 |
| 2008/0109616 A1* | 5/2008 | Taylor | G06F 3/0611 711/155 |
| 2008/0222384 A1* | 9/2008 | Wang | G06F 9/45504 711/207 |
| 2009/0282275 A1 | 11/2009 | Yermalayeu | |
| 2009/0307249 A1 | 12/2009 | Koifman | |
| 2009/0310412 A1* | 12/2009 | Jang | G06F 12/0246 365/185.11 |
| 2010/0229224 A1 | 9/2010 | Etchegoyen | |
| 2010/0325367 A1 | 12/2010 | Kornegay | |
| 2011/0055458 A1 | 3/2011 | Kuehne | |
| 2011/0153903 A1 | 6/2011 | Hinkle | |
| 2011/0218969 A1 | 9/2011 | Anglin | |
| 2011/0231598 A1 | 9/2011 | Hatsuda | |
| 2011/0292538 A1 | 12/2011 | Naga Tatsuya | |
| 2011/0302353 A1 | 12/2011 | Confalonieri | |
| 2012/0084523 A1 | 4/2012 | Littlefield | |
| 2012/0117399 A1 | 5/2012 | Chan | |
| 2012/0210095 A1 | 8/2012 | Nellans | |
| 2012/0246392 A1 | 9/2012 | Cheon | |
| 2013/0073798 A1 | 3/2013 | Kang | |
| 2013/0103889 A1* | 4/2013 | Jeong | G06F 12/0246 711/103 |
| 2013/0145085 A1 | 6/2013 | Yu | |
| 2013/0145089 A1 | 6/2013 | Eleftheriou | |
| 2013/0159251 A1 | 6/2013 | Skrenta | |
| 2013/0166820 A1 | 6/2013 | Batwara | |
| 2013/0173845 A1 | 7/2013 | Aslam | |
| 2013/0219131 A1 | 8/2013 | Alexandron | |
| 2013/0318283 A1 | 11/2013 | Small | |
| 2014/0108414 A1 | 4/2014 | Stillerman | |
| 2014/0233950 A1 | 8/2014 | Luo | |
| 2014/0250259 A1 | 9/2014 | Ke | |
| 2014/0304452 A1* | 10/2014 | de la Iglesia | G06F 12/0246 711/103 |
| 2014/0310574 A1 | 10/2014 | Yu | |
| 2014/0359229 A1 | 12/2014 | Cota-Robles | |
| 2014/0365707 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0142752 A1 | 5/2015 | Chennamsetty | |
| 2015/0372597 A1 | 12/2015 | Luo | |
| 2016/0098344 A1 | 4/2016 | Gorobets | |
| 2016/0110254 A1 | 4/2016 | Cronie | |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0343429 A1 | 11/2016 | Nieuwejaar | |
| 2016/0350002 A1 | 12/2016 | Vergis | |
| 2017/0162235 A1 | 6/2017 | De | |
| 2017/0168986 A1 | 6/2017 | Sajeepa | |
| 2017/0212708 A1 | 7/2017 | Suhas | |
| 2017/0228157 A1 | 8/2017 | Yang | |
| 2017/0344470 A1 | 11/2017 | Yang | |
| 2017/0353576 A1 | 12/2017 | Guim Bernat | |
| 2018/0024772 A1 | 1/2018 | Madraswala | |
| 2018/0088867 A1 | 3/2018 | Kaminaga | |
| 2018/0095824 A1* | 4/2018 | Agombar | G06F 11/1076 |
| 2018/0189182 A1* | 7/2018 | Wang | G06F 12/0891 |
| 2018/0373428 A1* | 12/2018 | Kan | G06F 3/061 |

OTHER PUBLICATIONS

ECC Parity: A Technique for Efficient Memory Error Resilience for Multi-Channel Memory Systems by Jian (Year: 2014).*

Coding for Error Detection and Correction by Shelton (Year: 1999).*

WOW:Wise Ordering for Writes—Combining Spatial and Temporal Locality in Non-Volatile Caches by Gill (Year: 2005).* https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

* cited by examiner

METHOD AND SYSTEM FOR MITIGATING WRITE AMPLIFICATION IN A PHASE CHANGE MEMORY-BASED STORAGE DEVICE

BACKGROUND

Field

This disclosure is generally related to the field of data storage. More specifically, this disclosure is related to a method and system for mitigating write amplification in a phase change memory-based storage device.

Related Art

The proliferation of the Internet and e-commerce continues to create a vast amount of digital content. Various storage systems have been created to access and store such digital content. One such storage system uses phase change memory (PCM), which is a type of non-volatile random access memory. PCM uses a specific type of glass and can hold multiple bits in a single cell (or sector). A standard PCM-based storage device typically writes data using a relatively large block or sector size (e.g., 4 kilobytes (KB)). In a situation with frequent I/O updates with small block sizes, the standard PCM-based storage device can suffer significant write amplification (e.g., when the actual amount of information physically written to storage media is a multiple of the logical amount intended to be written).

For example, given a sector with a size of 4 KB and a single update (e.g., a write) of only 128 bytes of data, the standard PCM-based storage device system must perform the following three operations: 1) read out the entire 4 KB sector from PCM; 2) modify the read-out sector with the updated 128 bytes; and 3) write back the entire 4 KB sector with the updated 128 bytes. This single update with three operations may result in a latency that is 2-3 times higher than a direct overwriting of data. Furthermore, the resulting write amplification has a high value of 32 (i.e., 4 KB/128 bytes). Given that PCM media may have an approximate lifespan of $10^{-7}$ program cycles (in that a cell is worn out after being written to $10^{-7}$ times), the lifespan of a standard PCM-based device may be a limiting factor in the design and deployment of a storage system. Thus, both the write amplification and the higher latency can decrease the efficiency of the storage system.

SUMMARY

One embodiment mitigates write amplification in a phase change memory-based storage device. During operation, the system receives, by a controller of the storage device, data to be stored in a phase change memory (PCM) of the storage device. The system writes, by the controller, the data to a sector of a volatile memory of the same storage device to obtain an updated portion of the sector. In response to detecting a predetermined condition, the system writes the updated portion to the PCM. In some embodiments, the system writes the updated portion to the PCM without writing an entirety of the sector to the PCM.

In some embodiments, the sector includes original data and original parity bits. The system writes the updated portion to the PCM by: comparing the data in the updated portion of the sector with the corresponding original data to obtain a first difference; aligning the first difference by pre-pending and appending zeros to the first difference; encoding the aligned first difference to obtain a second difference; comparing the original parity bits with the second difference to obtain new parity bits; and writing the updated portion and the new parity bits to the PCM.

In some embodiments, the predetermined condition is based on one or more of: reaching a predetermined timeout or expiration period for the updated portion; reaching a predetermined capacity threshold of the volatile memory; executing an instruction to write data from the volatile memory to the PCM; a loss in power; and detecting a predetermined time interval or frequency for writing data from the volatile memory to the PCM.

In some embodiments, writing the updated portion to the PCM is in response to determining that a length of the updated portion is less than a predetermined length.

In some embodiments, the system writes the data to the sector of the volatile memory in response to determining that a length of the received data is less than a predetermined length corresponding to a block size for the PCM. Furthermore, in response to determining that the length of the received data is not less than the predetermined length corresponding to the block size for the PCM, the system writes the received data to the PCM.

In some embodiments, prior to writing the updated portion to the PCM, the system: determines data which has been written to a plurality of sectors; aggregates the data into a second sector; and in response to detecting the predetermined condition, writes the aggregated data to the PCM.

In some embodiments, the system determines the data which has been written to the plurality of sectors based on one or more of: a frequency of access; a predetermined frequency of access; a preferential mapping algorithm; an observable condition; and a predetermined condition.

In some embodiments, prior to writing the aggregated data to the PCM, the system: generates parity bits for the aggregated data; and includes the generated parity bits with the aggregated data.

Another embodiment mitigates write amplification in a phase change memory-based storage device. During operation, the system receives, by a controller of the storage device, a request to read data. The system retrieves, by the controller, the requested data from a phase change memory (PCM) of the storage device, wherein the requested data has been previously written to the PCM from a volatile memory of the same storage device. In response to detecting a predetermined condition, the system writes, by the controller, the retrieved data to the volatile memory.

In some embodiments, the retrieved data corresponds to a first portion of a first sector of the PCM. The system writes the retrieved data to the volatile memory by: determining a second sector of the volatile memory, wherein the second sector corresponds to the first sector; writing the first portion to the second sector; aligning the first portion in the second sector based on a length of the first portion and a length of the second sector to obtain a new codeword; returning, by the controller, the first portion from the new codeword.

In some embodiments, the system retrieves the requested data from the PCM in response to determining that the requested data is not stored in the volatile memory. Furthermore, in response to determining that the requested data is stored in the volatile memory, the system returns the requested data from the volatile memory.

In some embodiments, the predetermined condition is based on one or more of: performing a caching algorithm; detecting a user-generated or host-configured condition; determining that the requested data is to be written to the volatile memory; analyzing statistics associated with access of the data; determining that a likelihood of the requested data to be requested or accessed is greater than a predetermined threshold; and an observable condition associated with the requested data.

BRIEF DESCRIPTION OF THE FIGURES

In the figures, like reference numerals refer to the same figure elements.

DETAILED DESCRIPTION

Figure 1:
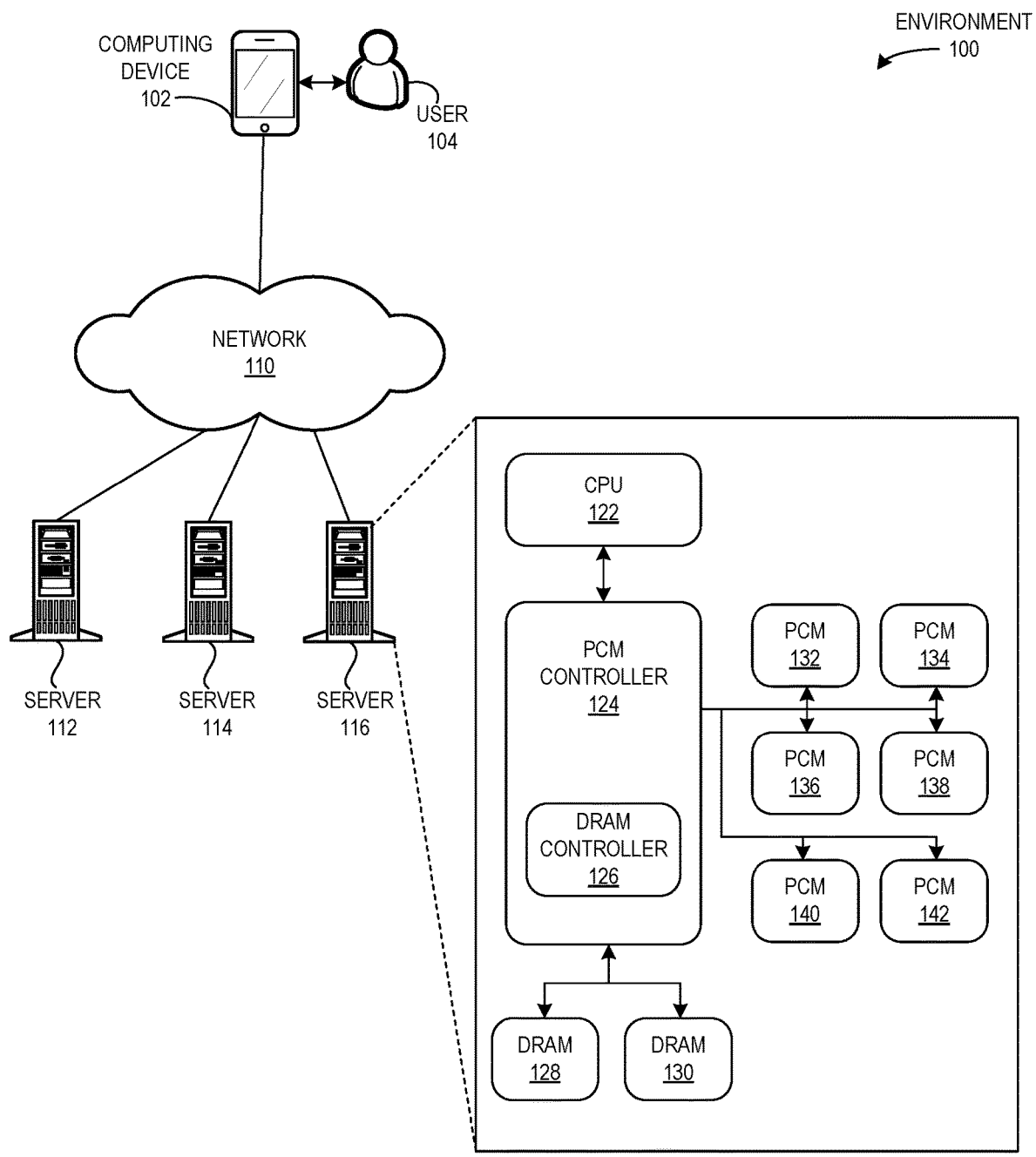
FIG. 1 illustrates an exemplary environment that facilitates mitigating write amplification in a phase change memory (PCM)-based storage device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of mitigating write amplification in a PCM-based storage device by adding volatile memory to the PCM-based storage device, along with a controller module to manage the data path. A standard PCM-based storage device typically writes data using a relatively large block or sector size (e.g., 4 KB). However, in the case of frequent I/O updates with small block sizes, the standard PCM-based storage device can suffer significant write amplification. For example, given a 4 KB sector and an update of only 128 bytes, the standard PCM-based storage device can experience a write amplification of 32 (4,024 bytes/128 bytes). The write amplification can result in a shorter overall lifespan for the PCM media. Furthermore, because a single update in a standard PCM-based storage device can require three operations (i.e., read out, modify, and write back), the standard PCM-based storage device may incur a higher latency than a direct overwriting operation. Both the write amplification and the increased latency can decrease the efficiency of the storage system.

The embodiments described herein facilitate mitigating write amplification in a PCM-based storage device ("PCM device") by including volatile memory (such as DRAM) in the PCM device. The PCM device incrementally stores and updates smaller data blocks in its internal DRAM and, based on a predetermined condition for flushing the data from DRAM to PCM, writes the updated blocks into the PCM media in a single operation (e.g., as a single codeword encoded with an error code correction (ECC)). The PCM device can also include a controller which manages the data path to/from the volatile memory (e.g., DRAM) and the PCM media, as well as a power-loss detecting circuit. The controller can determine the predetermined flushing condition, which can be based on, e.g., a timeout, a capacity of the data buffer, an explicit host instruction, a loss in power, and an update frequency.

Thus, the embodiments described herein provide a system which improves the efficiency of a storage system, where the improvements are fundamentally technological. The improved efficiency can include mitigating write amplification for I/O operations associated with a PCM-based storage device. The system provides a technological solution (i.e., a PCM-based storage device which places the volatile memory and the PCM media on the same storage device, and includes a controller module to manage the data path) to the technological problem of reducing latency in I/O tasks, increasing the lifespan of the PCM media, and improving the overall efficiency of the system.

The term "storage server" refers to a server which can include multiple drives and multiple memory modules.

The term "phase change memory-based storage device" or "PCM-based storage device" or "PCM device" refers to a device, as described herein, which includes volatile memory, a controller module, and PCM on the same device. A PCM device of the prior art is referred to herein as a "standard PCM-based storage device."

The term "volatile memory" refers to computer storage which can lose data quickly upon removal of the power source, such as DRAM.

The term "phase change memory" or "PCM" refers to a type of non-volatile random access memory, which can be used for long-term persistent computer storage.

The term "ECC-encoding" refers to encoding data based on an error correction code, while the term "ECC-decoding" refers to decoding data based on the error correction code.

The term "PCM controller" refers to a module located in a PCM-based storage device, and includes logic which controls data access to/from the PCM on the storage device. The term "DRAM controller" refers to a module located in the PCM controller, and includes logic which controls data access to/from the volatile memory (e.g., DRAM) on the same storage device as the PCM controlled by the PCM controller. In the embodiments described herein, the controllers are situated in the data path between the volatile memory and the PCM. The DRAM controller also includes a data buffer, into which data is written for temporary storage, and subsequently written or flushed into the PCM. The controller's data buffer can also include data which is being processed by the controller, including being compared, aligned, and ECC-encoded/decoded, as described below in relation to FIGS. 2 and 3B.

Exemplary System

FIG. 1 illustrates an exemplary environment 100 that facilitates mitigating write amplification in a phase change memory (PCM)-based storage device, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with servers 112, 114, and 116, which can be part of a distributed storage system. Servers 112-116 can include a storage server, which can include a phase change memory (PCM)-based storage device. For example, server 116 can include a CPU 122, which communicates with a PCM controller 124. PCM controller 124 can communicate with phase change memory media (such as PCMs 132, 134, 136, 138, 140, and 142), and can further include a DRAM controller 126. DRAM controller 126 can communicate with volatile memory (such as DRAMs 128 and 130), and can further include a data buffer (not shown).

By including CPU 122, DRAM controller 126, and DRAMs 128 and 130 in PCM-based storage device 116, the embodiments described herein can avoid frequent transmission of data through a host fabric, such as a Peripheral Component Interface Express (PCIe) bus. DRAM controller 126 can read old data directly from local PCMs 132-142 into its own data buffer, make the modification, and write the data back. Because the entirety of these operations occur inside PCM-based storage device 116, the system can avoid the cost associated with transmitting and reading data via a PCIe bus.

Thus, server 116 depicts an exemplary architecture of a PCM-based storage device, as in the embodiments described herein. A general data flow is described below in relation to FIG. 2. An exemplary data flow in a write operation is described below in relation to FIGS. 3A, 3B, and 4, and an exemplary data flow in a read operation is described below in relation to FIGS. 5A and 5B.

Exemplary Flow for Processing Data from Volatile Memory to PCM

Figure 2:
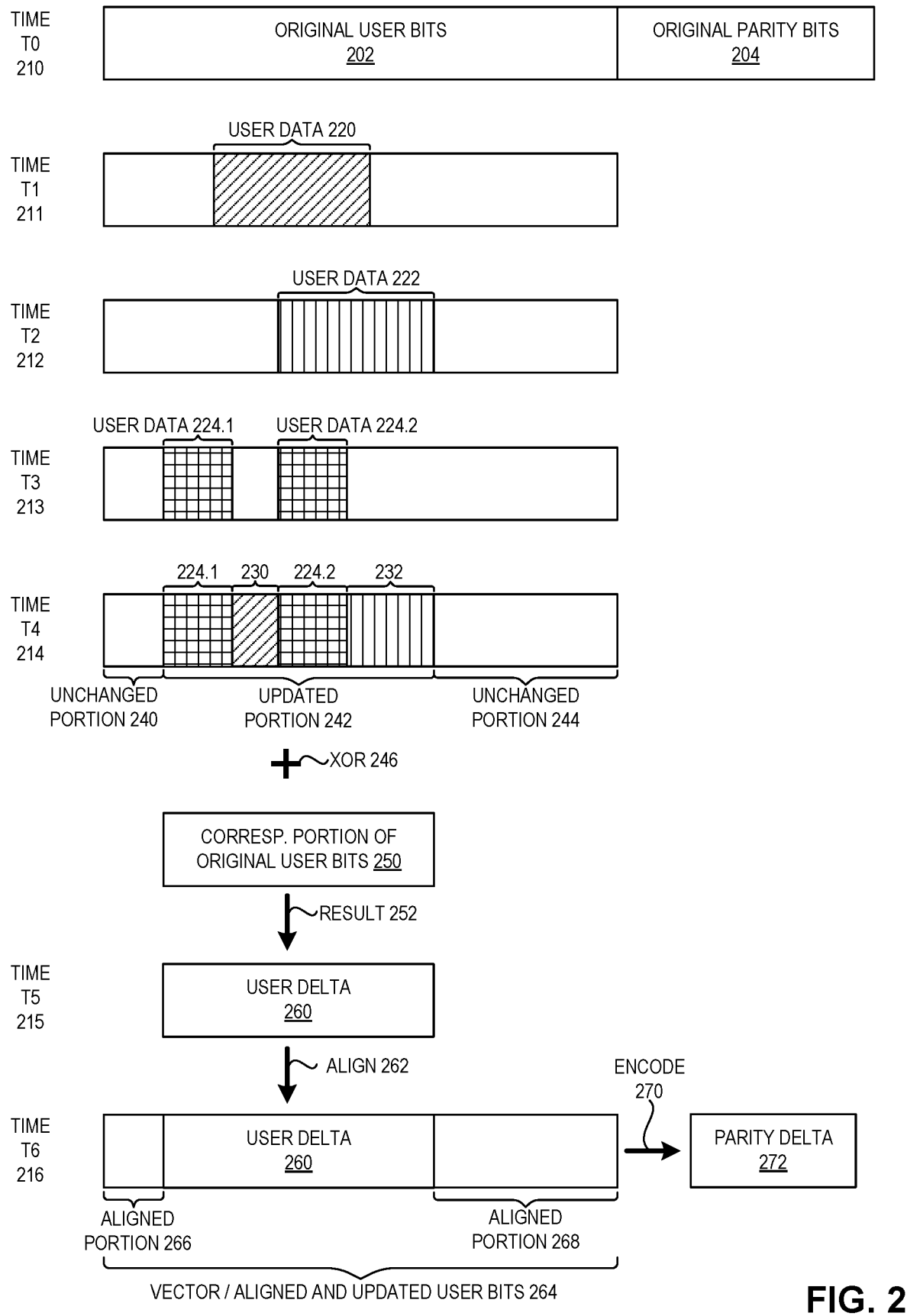
FIG. 2 illustrates an exemplary flow for accumulating updated user data in volatile memory and for writing the updated user data to PCM, in accordance with an embodiment of the present application.

FIG. 2 illustrates an exemplary flow for accumulating updated user data in volatile memory and for writing the updated user data to PCM, in accordance with an embodiment of the present application. To ensure the security of stored data, the system may perform error correction code (ECC) encoding on data before storing the data in the PCM. At a time T0 210, a sector of data in volatile memory (e.g., DRAM) can include original user bits 202 and original parity bits 204. Original parity bits 204 can be the bits which are added to original user bits 202 upon an ECC-encoding.

In the embodiments described herein, the system can incrementally update blocks in a single sector in the volatile memory, before processing the data and flushing the processed data to the PCM. For example, at a time T1 211, user data 220 can be written to a portion of the sector. At a time T2 212, user data 222 can be written to the sector. At a time T3 213, user data 224.1 and 224.2 can be written to the sector. New user data which is written to the sector simply overwrites the corresponding portion of the sector. Thus, at a time T4 214, the sector includes an unchanged portion 240, an updated portion 242, and an unchanged portion 244. Updated portion 242 can include: user data 224.1; user data 230 (which is the portion of user data 220 not overwritten by subsequent user data); user data 224.2; and user data 232 (which is the portion of user data 222 not overwritten by subsequent data).

The system can detect a predetermined condition to write the updated portion from the DRAM to the PCM. Exemplary conditions are described below in relation to FIG. 4. The system can compare updated portion 242 with a corresponding portion of original user bits 250 (of original user bits 202) to obtain a user delta 260 (via an XOR operation 236 and a result 252). Thus, at a time T5 215, user delta 260 is the difference between original user bits 250 and updated portion 242.

At a time T6 216, the system can align user delta 260 with the original sector size (align function 252). For example, based on the length of user delta 260 and the length of original user bits 202, the system can prepend and append user delta 260 with zeroes, which forms a vector 264 (or an aligned and updated user bits 264). Vector 264 can include an aligned portion 266, user delta 260, and an aligned portion 268. The system can encode vector 264 (via encode operation 270) to obtain a parity delta 272. Subsequently, the system can write to the PCM media the entire updated sector (including parity delta 272 appended to vector 264).

Thus, by accumulating small block sized user updates in internal DRAM, and by flushing the accumulated blocks to the PCM based on a predetermined condition, the embodiments described herein provide a PCM-based storage device which facilitates mitigating write amplification, and thus results in a more efficient storage system.

Exemplary Communication During a Write Operation

Figure 3A:
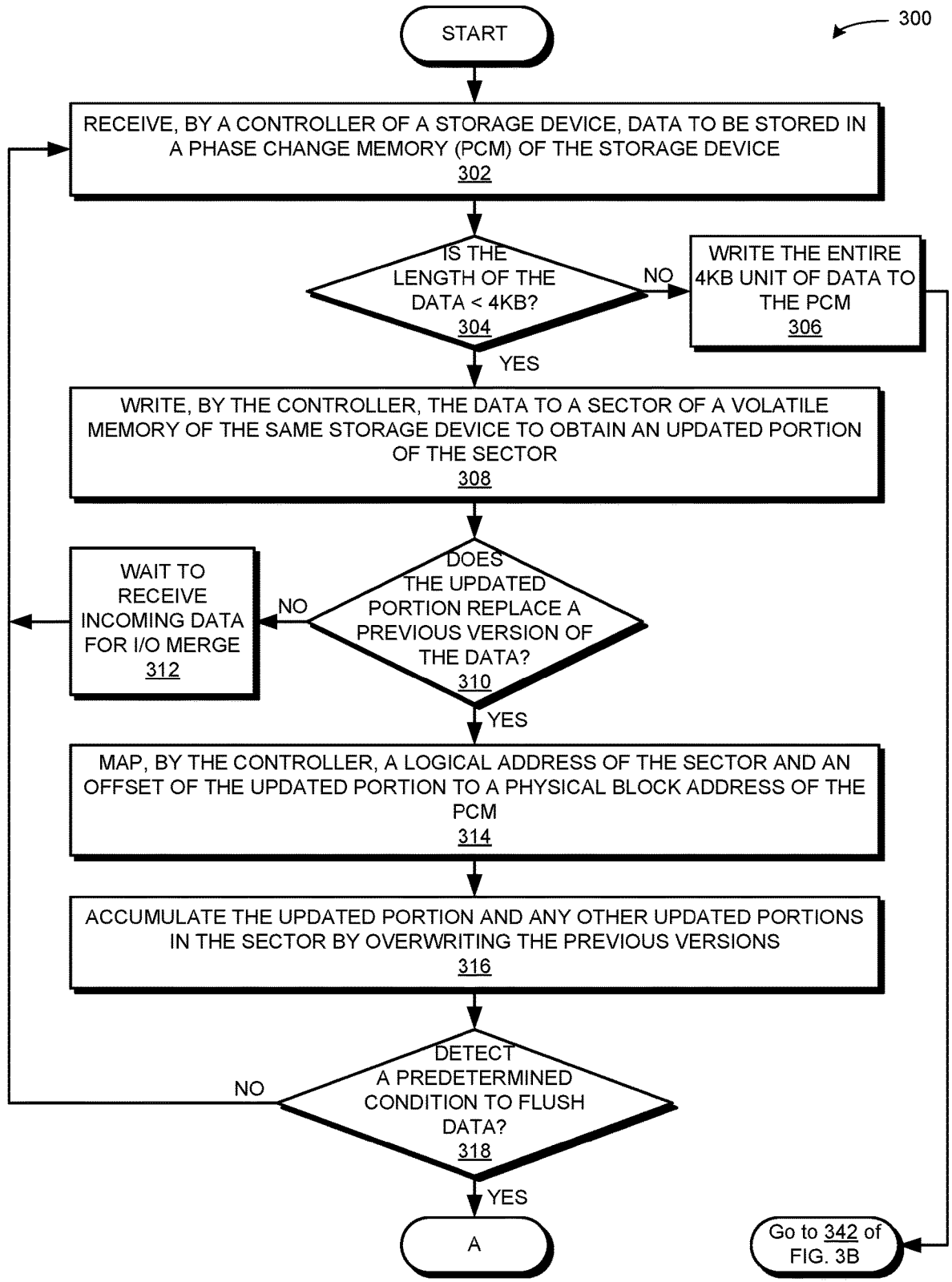
FIG. 3A presents a flowchart illustrating a method for writing data in a PCM-based storage device, in accordance with an embodiment of the present application.

FIG. 3A presents a flowchart 300 illustrating a method for writing data in a PCM-based storage device, in accordance with an embodiment of the present application. During operation, the system receives, by a controller of the storage device, data to be stored in a phase change memory (PCM) of the storage device (operation 302). If the length of the data is not less than 4 KB (decision 304), the system writes the entire 4 KB unit of data to the PCM (operation 306), and the operation continues at operation 342 of FIG. 3B. If the length of the data is less than 4 KB (decision 304), the system writes, by the controller, the data to a sector of a volatile memory of the same storage device to obtain an updated portion of the sector (operation 308). The system determines whether the updated portion replaces a previous version of the data (decision 310). If it does not, the system waits to receive incoming data for an I/O merge (operation 312), and the operation returns to operation 302.

If the system does determine that the updated portion replaces a previous version of the data (decision 310), the system maps, by the controller, a logical address of the sector and an offset of the updated portion to a physical block address of the PCM (operation 314). The system accumulates the updated portion and any other updated portions in the sector by overwriting the previous versions (operation 316). If the system does not detect a predetermined condition to flush data from the volatile memory to the PCM (decision 318), the operation returns to operation 302. If the system does detect a predetermined condition to flush data from the volatile memory to the PCM (decision 318), the operation continues as described at Label A of FIG. 3B.

Figure 3B:
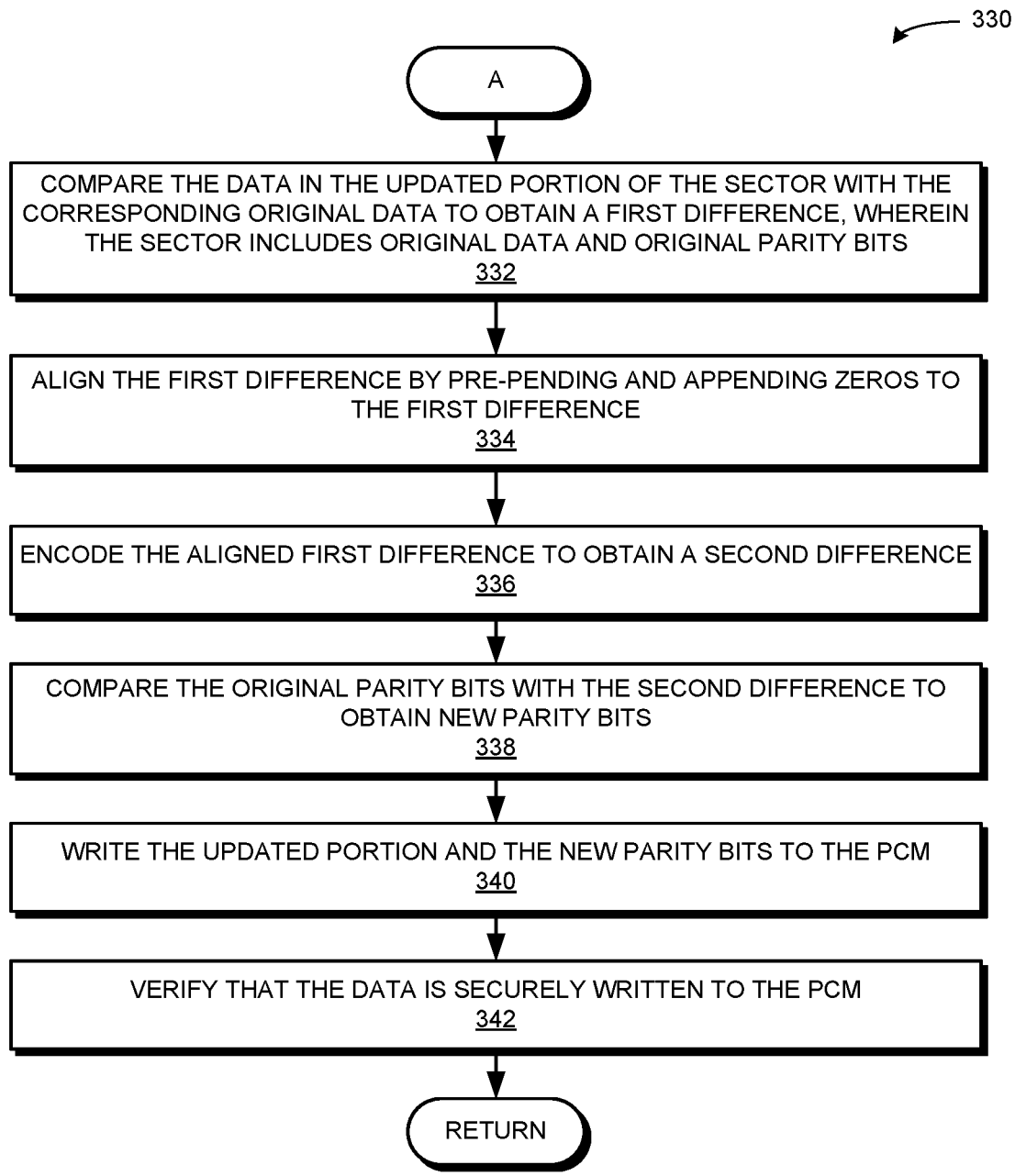
FIG. 3B presents a flowchart illustrating a method for writing data in a PCM-based storage device, in accordance with an embodiment of the present application.

FIG. 3B presents a flowchart 330 illustrating a method for writing data in a PCM-based storage device, in accordance with an embodiment of the present application. During operation, the system compares the data in the updated portion of the sector with the corresponding original data to obtain a first difference, wherein the sector includes original data and original parity bits (operation 332). The system aligns the first difference by pre-pending and appending zeros to the first difference (operation 334) (e.g., based on a length of the first difference and a length of the sector). The system encodes the aligned first difference to obtain a second difference (operation 336). The system compares the original parity bits with the second difference to obtain new parity bits (operation 338). The system writes the updated portion and the new parity bits to the PCM (operation 340). The system verifies that the data is securely written to the PCM (operation 342), and the operation returns.

Detecting Trigger Conditions for Flushing Data from DRAM to PCM

Figure 4:
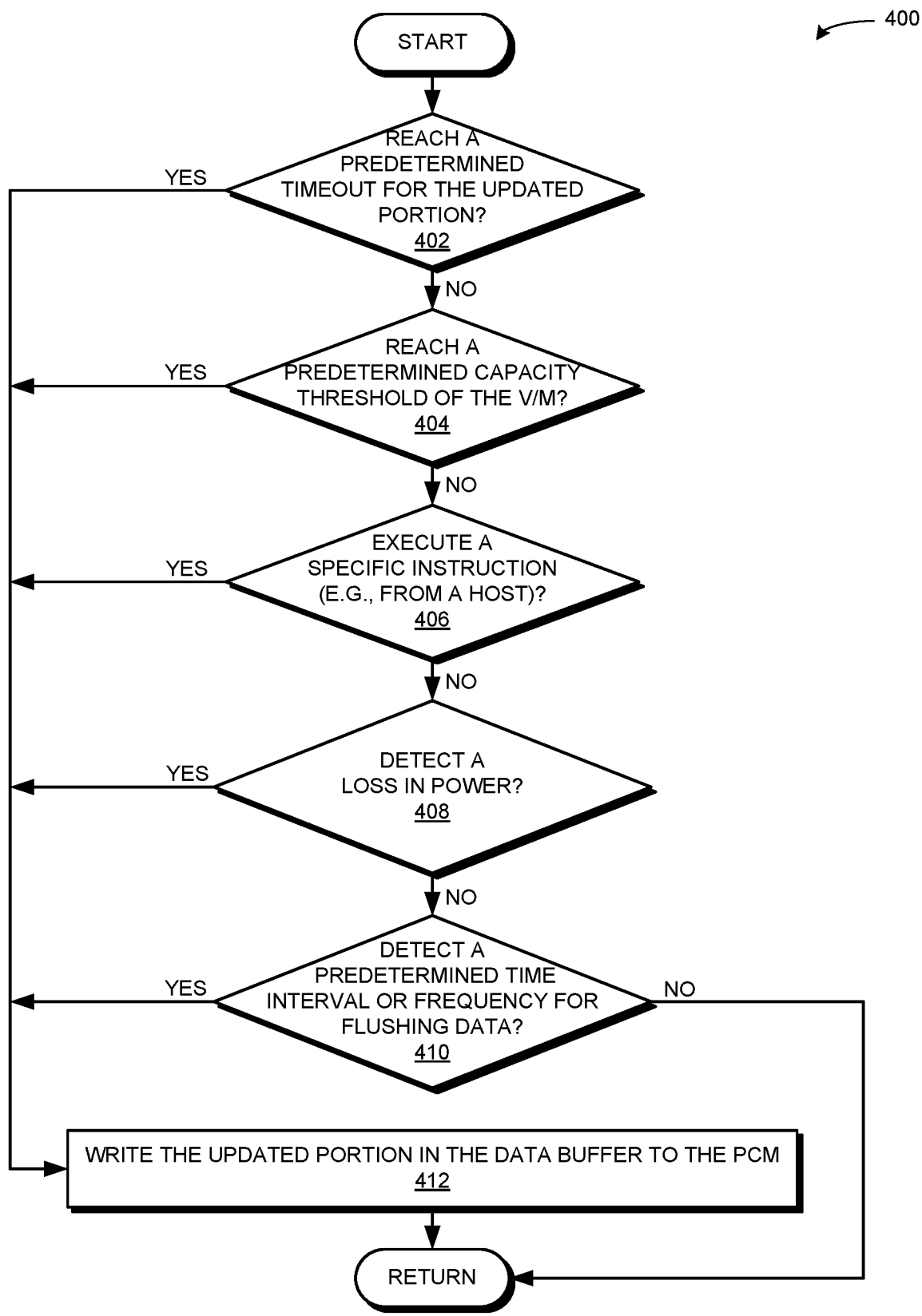
FIG. 4 presents a flowchart illustrating a method for determining a predetermined condition for flushing data to PCM, in accordance with an embodiment of the present application.

FIG. 4 presents a flowchart 400 illustrating a method for determining a predetermined condition for flushing data to PCM, in accordance with an embodiment of the present application. If the system reaches a predetermined timeout for the updated portion (decision 402), the system writes the updated portion in the data buffer to the PCM (operation 412). If not, and if the system reaches a predetermined capacity threshold of the volatile memory (decision 404), the system writes the updated portion in the data buffer to the PCM (operation 412). If not, and if the system determines to execute a specific instruction (e.g., from a host) (decision 406), the system writes the updated portion in the data buffer to the PCM (operation 412). If not, and if the system detects (e.g., by a power-loss detecting circuit in the PCM-based storage device) a loss in power (decision 408), the system writes the updated portion in the data buffer to the PCM (operation 412). If not, and if the system detects a predetermined time interval or frequency for flushing data (decision 410), the system writes the updated portion in the data buffer to the PCM (operation 412). If not, the operation returns.

Note that while decisions 402-410 are depicted in a specific order in flowchart 400, the controller can perform operation 412 upon detecting any of the predetermined conditions represented by decisions 402-410.

Exemplary Communication During a Read Operation

Figure 5A:
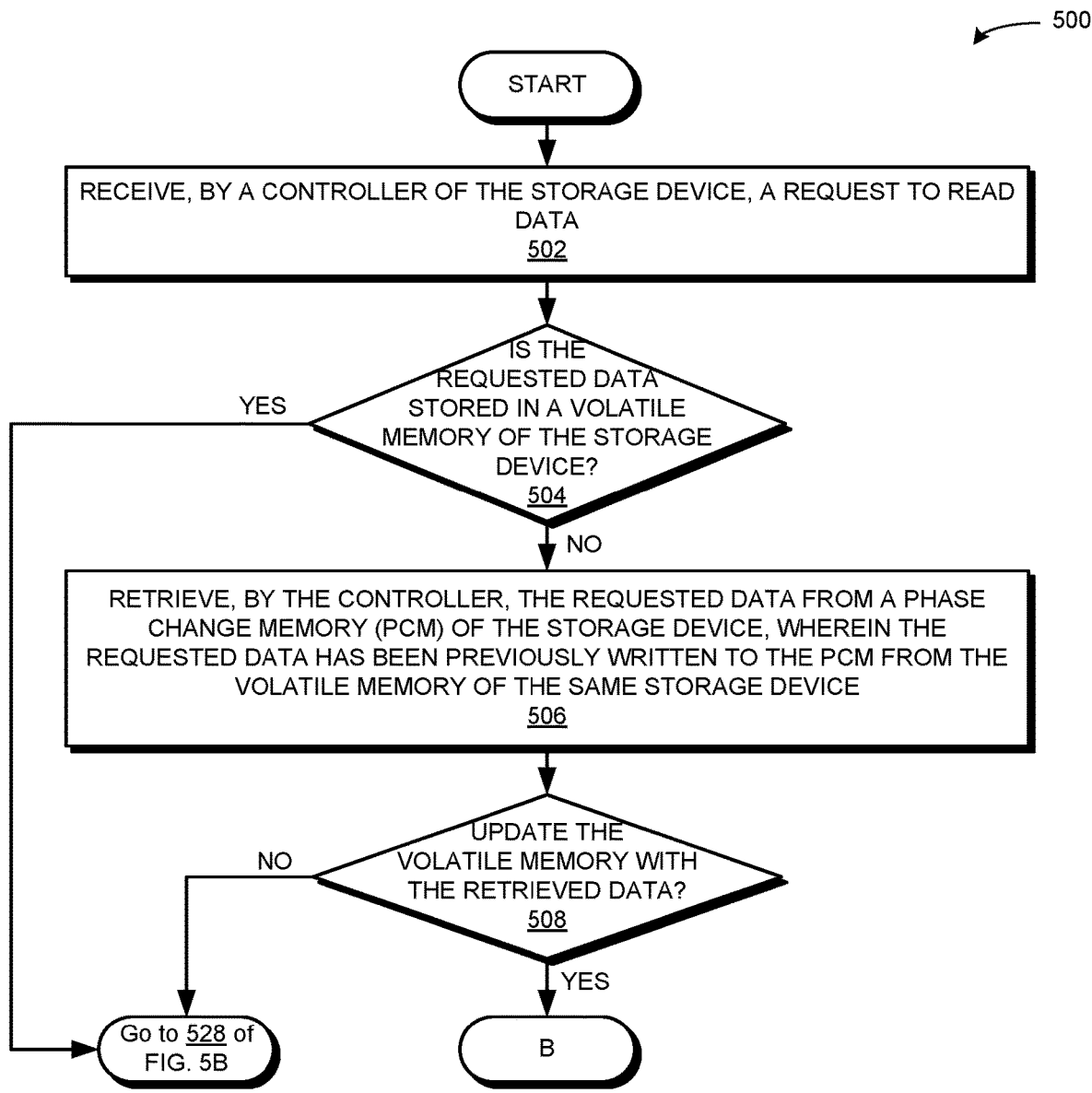
FIG. 5A presents a flowchart illustrating a method for reading data in a PCM-based storage device, in accordance with an embodiment of the present application.

FIG. 5A presents a flowchart 500 illustrating a method for reading data in a PCM-based storage device, in accordance with an embodiment of the present application. During operation, the system receives, by a controller of the storage device, a request to read data (operation 502). If the requested data is stored in a volatile memory of the storage device (decision 504), the operation continues as described at operation 528 of FIG. 5B. If the requested data is not stored in the volatile memory of the storage device (decision 504), the system retrieves, by the controller, the requested data from a phase change memory (PCM) of the storage device, wherein the requested data has been previously written to the PCM from the volatile memory of the same storage device (operation 506). If the system determines not to update the volatile memory with the retrieved data (decision 508), the operation continues as described at operation 528 of FIG. 5B. If the system does determine to update the volatile memory with the retrieved data (decision 508), the operations continues at Label B of FIG. 5B.

Figure 5B:
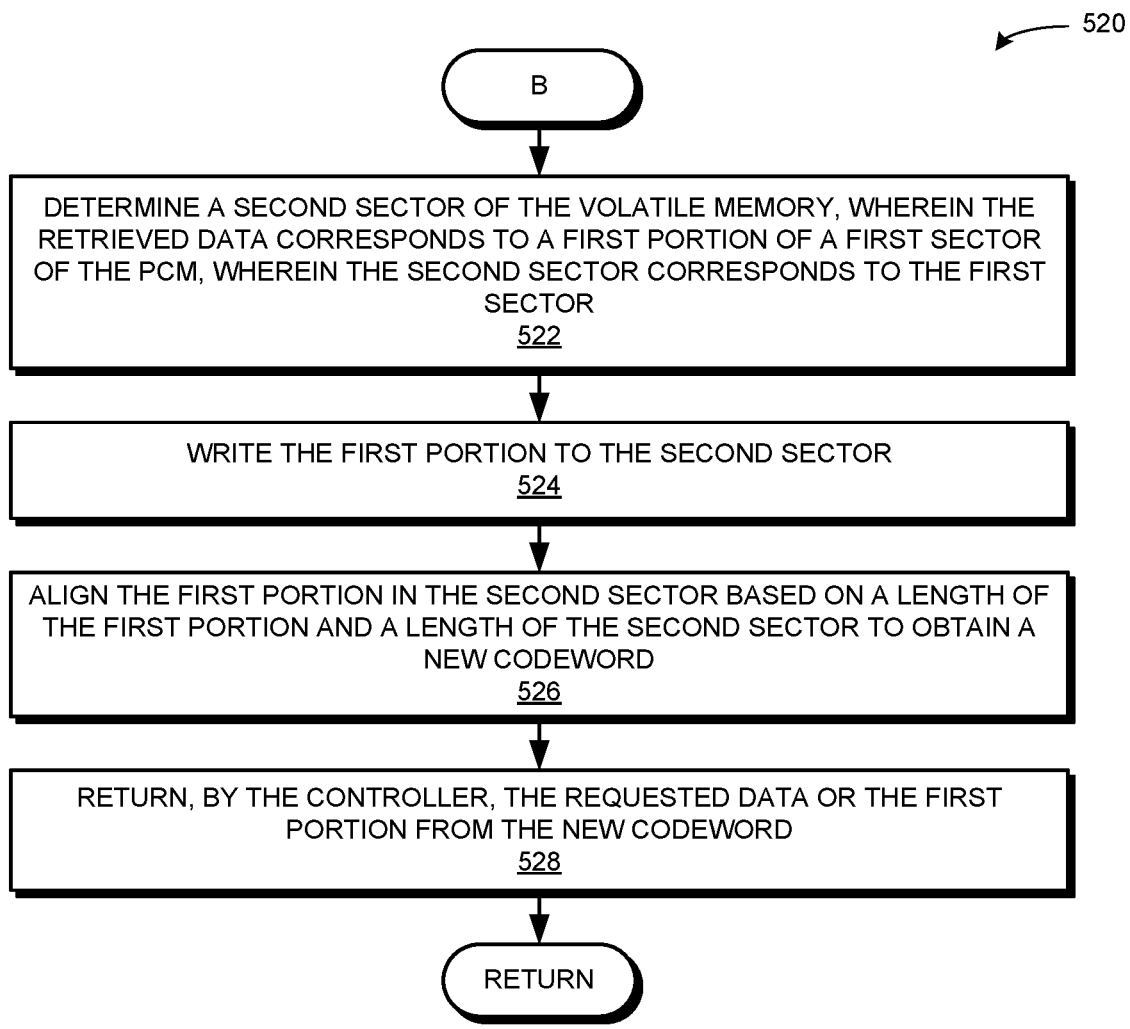
FIG. 5B presents a flowchart illustrating a method for reading data in a PCM-based storage device, in accordance with an embodiment of the present application.

FIG. 5B presents a flowchart 520 illustrating a method for reading data in a PCM-based storage device, in accordance with an embodiment of the present application. During operation, the system determines a second sector of the volatile memory, wherein the retrieved data is stored in a first portion of a first sector of the PCM, and wherein the second sector of the volatile memory corresponds to the first sector of the PCM (operation 522). The system writes the retrieved data from the first portion to the second sector (operation 524). The system aligns the written data from the first portion in the second sector based on a length of the first portion and a length of the second sector to obtain a new codeword (operation 526). The system returns, by the controller, the requested data or the written data from the first portion in the second sector from the new codeword (operation 528), and the operation returns.

Exemplary Use Cases Showing Data Distribution; Reshuffling Method

Figure 6A:
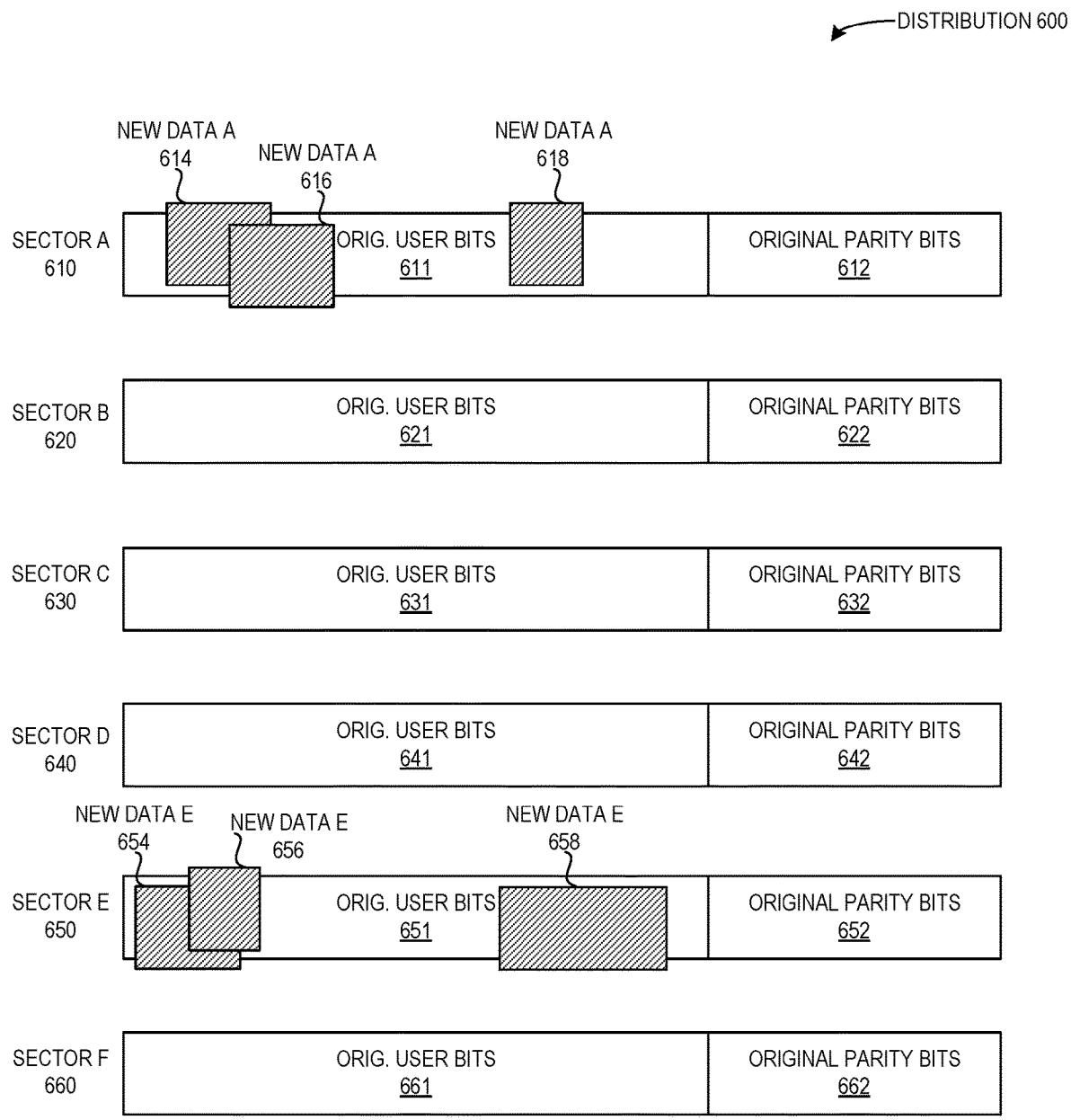
FIG. 6A illustrates an exemplary distribution of user data in volatile memory, based on a statistically hot uneven distribution, in accordance with an embodiment of the present application.

FIG. 6A illustrates an exemplary distribution 600 of user data in volatile memory, based on a statistically hot uneven distribution, in accordance with an embodiment of the present application. Distribution 600 includes six sectors: sector A 610 includes original user bits 611 and original parity bits 612; sector B 620 includes original user bits 621 and original parity bits 622; sector C 630 includes original user bits 631 and original parity bits 632; sector D 640 includes original user bits 641 and original parity bits 642; sector E 650 includes original user bits 651 and original parity bits 652; and sector F 660 includes original user bits 661 and original parity bits 662. The statistically uneven hot distribution 600 shown in FIG. 6A results in a preferred distribution for the embodiments described herein. New blocks of user data (i.e., updated data) are written to only two of the depicted six sectors, which results in a need for fewer overall write operations (e.g., flushing the updated data). Three blocks of new user data (new data A 614, 616, and 618) are written to sector A in the original user bits 611, overwriting the previous bits as shown, and as described above in relation to FIG. 2. Three other blocks of new user data (new data E 654, 656, and 658) are written to sector E in the original user bits 651, similarly overwriting the previous bits as shown.

Figure 6B:
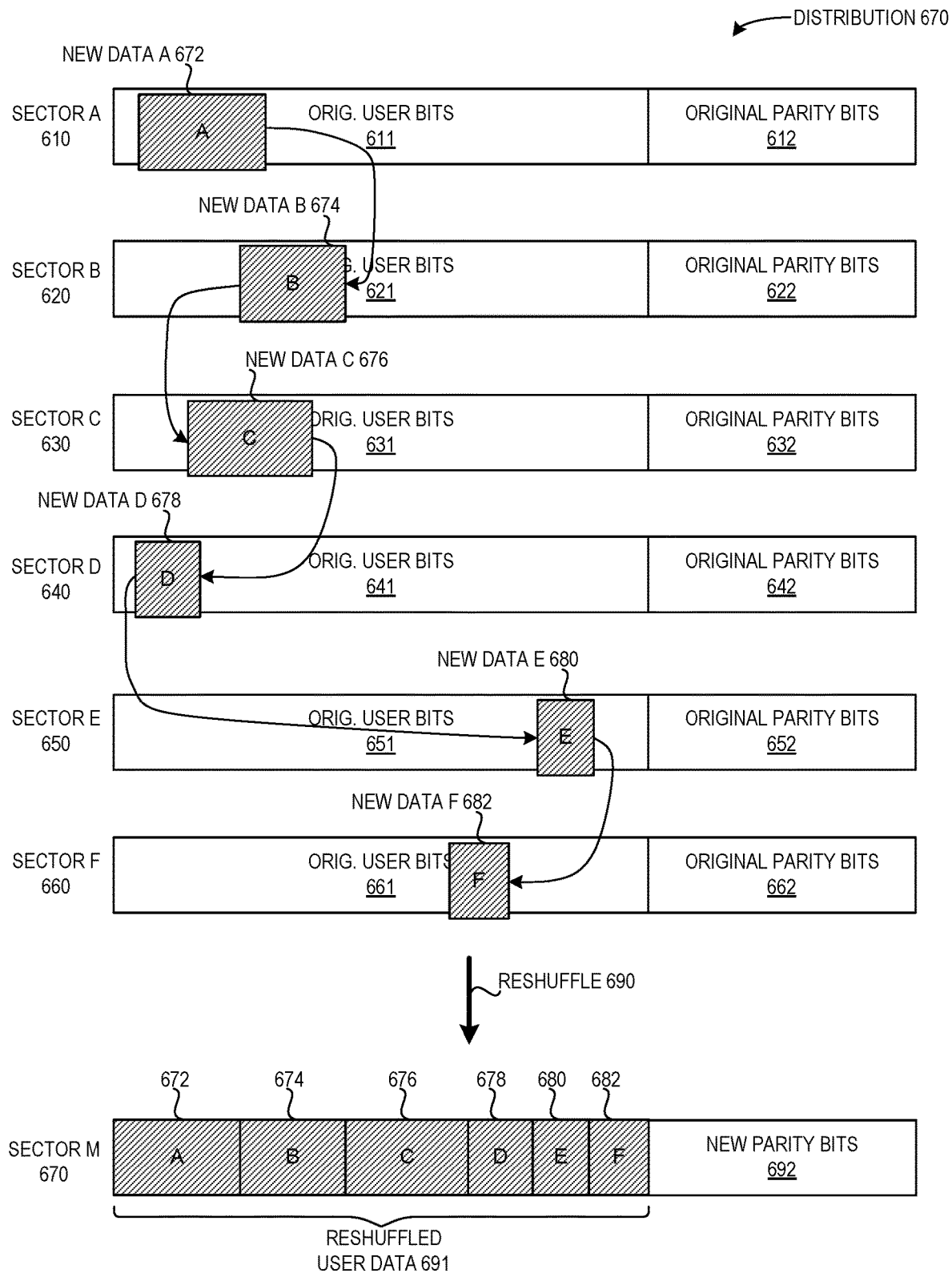
FIG. 6B illustrates an exemplary distribution of user data in volatile memory, based on a statistically hot even distribution and a method for reshuffling data, in accordance with an embodiment of the present application.

In contrast, a statistically even hot distribution can result in flushing sectors even when only one small data block has been updated in each sector. FIG. 6B illustrates an exemplary distribution 670 of user data in volatile memory, based on a statistically hot even distribution and a method for reshuffling data, in accordance with an embodiment of the present application. Six blocks of new user data are written to each of the six sectors: new data A 672 is written to sector A 610; new data B 674 is written to sector B 620; new data C 676 is written to sector C 630; new data D 678 is written to sector D 640; new data E 680 is written to sector E 650; and new data F 682 is written to sector F 660. The controller of a PCM-based storage device can monitor the frequency of access of data blocks A-F (i.e., 672-682), and allocate a new physical location for these frequently updated blocks, e.g., by a using a preferential mapping algorithm. Rather than inefficiently (and frequently) performing six separate writes to the PCM, where each update is only for a small block of data, the controller can aggregate or group the frequently accessed blocks into a single sector and perform only one write to the PCM. For example, the controller can detect or determine the frequently accessed data blocks A-F, reshuffle these determined blocks A-F (reshuffle operation 690), and place them as reshuffled user data 691 in a new sector M 670, along with new parity bits 692. In this way, the system can perform only one write instead of six, resulting in a more efficient storage system with both an increased latency and an increased lifespan for the PCM.

Another advantage to employing such a preferential mapping algorithm is that the system need no longer wait for a natural expiration of any of blocks A-F in order to write the data to the PCM. Instead, the system can place frequently accessed blocks of data together in one physical location and write the entire block to the PCM in one operation. The system may base the block selection (e.g., the preferential mapping algorithm) not only on frequency of access but also on any other observable or preconfigured condition detected by the controller.

Exemplary Computer System and Apparatus

Figure 7:
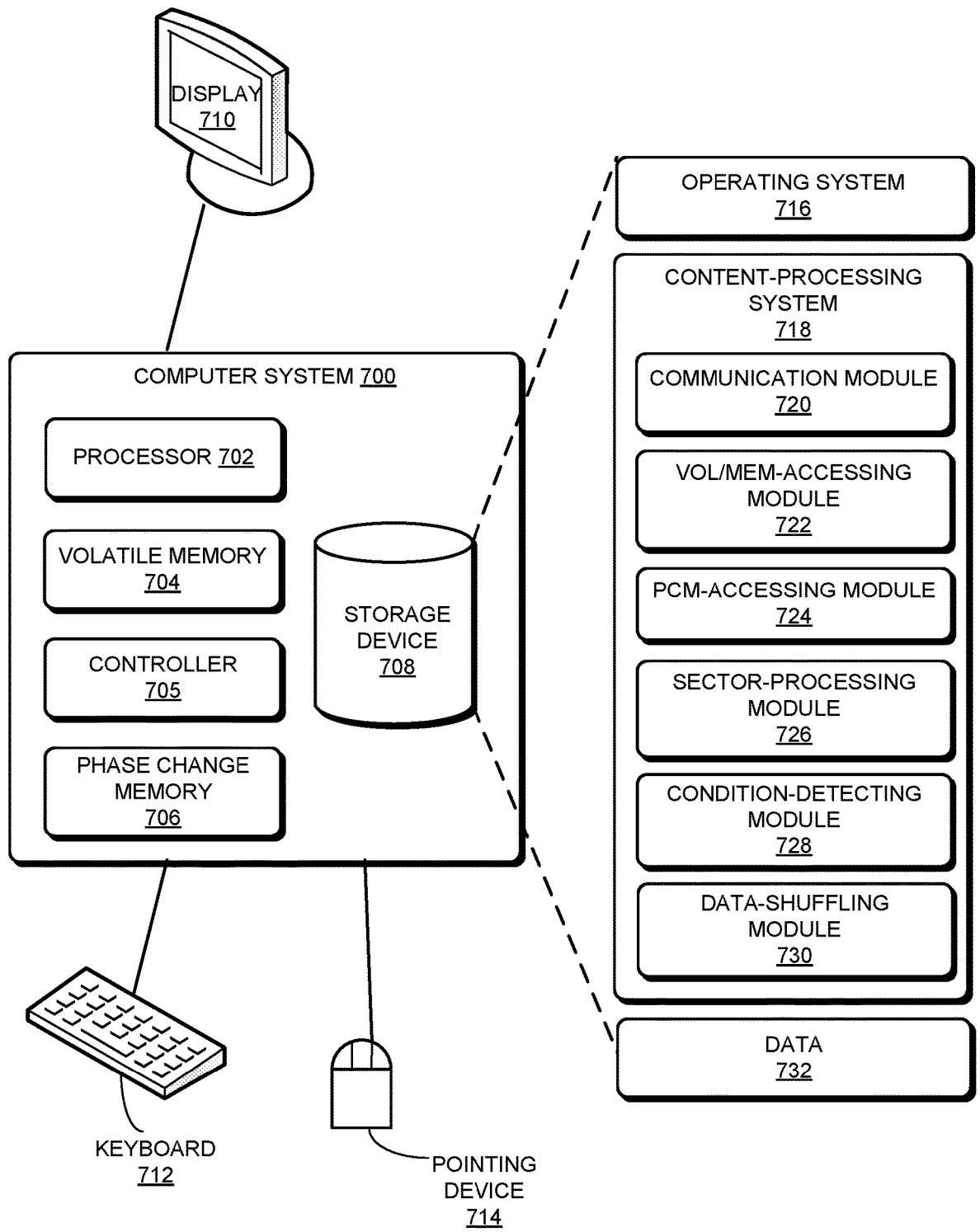
FIG. 7 illustrates an exemplary computer system that facilitates mitigating write amplification in a phase change memory (PCM)-based storage device, in accordance with an embodiment of the present application.

FIG. 7 illustrates an exemplary computer system 700 that facilitates mitigating write amplification in a phase change memory (PCM)-based storage device, in accordance with an embodiment of the present application. Computer system 700 includes a processor 702, a volatile memory 704, a controller 705, a phase change memory (PCM) 706, and a storage device 708. Computer system 700 may be a client-serving machine. Volatile memory 704 can include, e.g., RAM, that serves as a managed memory, and can be used to store one or more memory pools. PCM 706 can include persistent storage that is accessed via controller 705. Furthermore, computer system 700 can be coupled to a display device 710, a keyboard 712, and a pointing device 714. Storage device 708 can store an operating system 716, a content-processing system 718, and data 732.

Content-processing system 718 can include instructions, which when executed by computer system 700, can cause computer system 700 to perform methods and/or processes described in this disclosure. Specifically, content-processing system 718 can include instructions for receiving and transmitting data packets, including a request to write or read data, and data to be processed (e.g., encoded, aligned, or compared) and stored. Content-processing system 718 can further include instructions for receiving, by a controller of a storage device, data to be stored in a phase change memory (PCM) of the storage device (communication module 720). Content-processing system 718 can include instructions for writing, by the controller, the data to a sector of a volatile memory of the same storage device to obtain an updated portion of the sector (volatile memory-accessing module 722). Content-processing system 718 can include instructions for, in response to detecting a predetermined condition, writing the updated portion to the PCM (condition-detecting module 728 and PCM-accessing module 724).

Content-processing system 718 can include instructions for processing data to be written to the PCM, including: comparing the data in the updated portion of the sector with the corresponding original data to obtain a first difference; aligning the first difference by pre-pending and appending zeros to the first difference; encoding the aligned first difference to obtain a second difference; comparing the original parity bits with the second difference to obtain new parity bits; and writing the updated portion and the new parity bits to the PCM (sector-processing module 726).

Content-processing system 718 can include instructions for determining data which has been written to a plurality of sectors, and aggregating the data into a second sector (data-shuffling module 730).

Content-processing system 718 can include instructions for receiving, by a controller of a storage device, a request to read data (communication module 720). Content-processing system 718 can include instructions for retrieving, by the controller, the requested data from a phase change memory (PCM) of the storage device (PCM-accessing module 724). Content-processing system 718 can include instructions for, in response to detecting a predetermined condition, writing, by the controller, the retrieved data to the volatile memory (condition-detecting module 728 and volatile memory-accessing module 722).

Data 732 can include any data that is required as input or that is generated as output by the methods and/or processes described in this disclosure. Specifically, data 732 can store at least: data to be written, read, stored, or accessed; processed or stored data; encoded or decoded data; an error correction code (ECC) encoding or decoding; a codeword; parity bits; an indicator of whether data is stored in volatile memory or PCM; a block; a sector; a logical block address; a physical block address; a buffer for data in volatile memory; a condition to flush data from volatile memory to PCM; a pre-determined condition for writing, storing, or flushing data; a level of power; a loss in power level; a sector; a portion of a sector; data; aligned portions; a vector; a difference which is the result of a comparison; a timeout; an expiration period; a percentage of a capacity of a data buffer; a capacity threshold; an instruction; a threshold; a timeout; an expiration; a frequency; a length of data, a block, or a sector; a frequency of access; a preferential mapping algorithm; a reshuffling method; an observable condition; and a configured condition.

Figure 8:
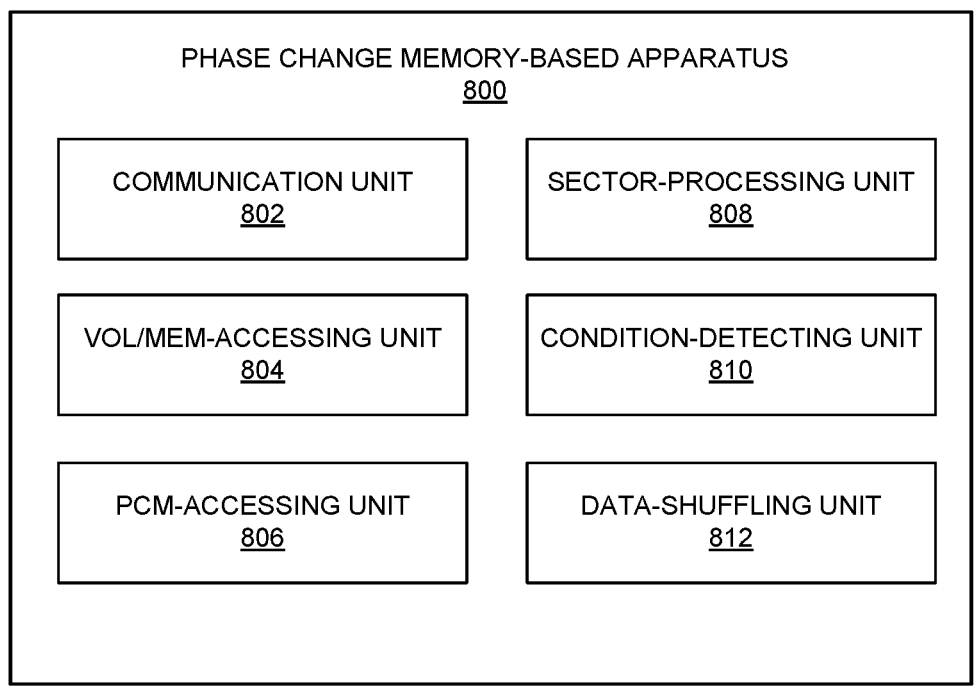
FIG. 8 illustrates an exemplary apparatus that facilitates mitigating write amplification in a phase change memory (PCM)-based storage device, in accordance with an embodiment of the present application.

FIG. 8 illustrates an exemplary apparatus 800 that facilitates mitigating write amplification in a phase change memory (PCM)-based storage device, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-812 which perform functions or operations similar to modules 720-730 of computer system 700 of FIG. 7, including: a communication unit 802; a volatile memory-accessing unit 804; a PCM-accessing unit 806; a sector-processing unit 808; a condition-detecting unit 810; and a data-shuffling unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, fieldprogrammable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for mitigating write amplification in a phase change memory-based storage device, the method comprising:
   receiving, by a controller of the storage device, first data to be stored in a phase change memory (PCM) of the storage device;
   writing, by the controller, the first data to a portion of a first sector of a volatile memory of the same storage device to obtain an updated portion of the first sector;
   monitoring a frequency of access of second data previously written to a plurality of sectors of the volatile memory;
   identifying a set of the second data including the updated portion of the first sector based on the monitored access frequency being greater than a predetermined threshold;
   aggregating the identified set of the second data into a second sector of the volatile memory; and
   in response to detecting a first predetermined condition, writing the aggregated data in the second sector of the volatile memory to the PCM.

2. The method of claim 1, wherein the first sector includes original data and original parity bits, wherein the original data includes data which has directly overwritten data previously stored in the first sector, and wherein the method further comprises, in response to detecting a second predetermined condition, writing the updated portion to the second sector of the PCM by:
   comparing the data in the updated portion of the first sector with the corresponding original data to obtain a first difference;
   aligning the first difference based on a length of the first difference and a length of the original data;
   encoding the aligned first difference to obtain a second difference;
   comparing the original parity bits with the second difference to obtain new parity bits; and
   writing the updated portion and the new parity bits to the second sector of the PCM.

3. The method of claim 2, wherein the first or second predetermined condition is based on one or more of:
   reaching a predetermined timeout or expiration period for the updated portion;
   reaching a predetermined capacity threshold of the volatile memory;
   executing an instruction to write data from the volatile memory to the PCM;
   a loss in power; and
   detecting a predetermined time interval or frequency for writing data from the volatile memory to the PCM.

4. The method of claim 2, wherein writing the updated portion to the second sector of the PCM is in response to determining that a length of the updated portion is less than a predetermined length.

5. The method of claim 1, wherein writing the first data to the first sector of the volatile memory is in response to determining that a length of the received first data is less than a predetermined length corresponding to a block size for the PCM, and wherein the method further comprises:
   in response to determining that the length of the received first data is not less than the predetermined length corresponding to the block size for the PCM, writing the received first data to the PCM.

6. The method of claim 1, wherein identifying the second set of data is based on one or more of:
   an observable condition; and
   the first or second predetermined condition.

7. The method of claim 1, wherein prior to writing the aggregated data in the second sector of the volatile memory to the PCM, the method further comprises:
   generating parity bits for the aggregated data; and
   including the generated parity bits with the aggregated data.

8. A computer-implemented method for mitigating write amplification in a phase change memory-based storage device, the method comprising:
   receiving, by a controller of the storage device, a request to read first data;
   retrieving, by the controller, the requested first data from a phase change memory (PCM) of the storage device, wherein the requested first data has been previously written to the PCM from a volatile memory of the same storage device;
   in response to detecting a first predetermined condition, writing, by the controller, the retrieved first data to the volatile memory;
   updating a portion of a first section of the volatile memory containing the first data;
   monitoring a frequency of access of second data previously written to a plurality of sectors of the volatile memory;
   identifying a set of the second data including the portion of the first sector based on the monitored access frequency being greater than a predetermined threshold;
   aggregating the identified set of the second data into a new sector of the volatile memory; and
   in response to detecting a second predetermined condition, writing the aggregated data in the new sector of the volatile memory to the PCM.

9. The method of claim 8, wherein the retrieved first data is stored in a first portion of a first sector of the PCM, and wherein writing the retrieved first data to the volatile memory further comprises:
   determining a second sector of the volatile memory, wherein the second sector of the volatile memory corresponds to the first sector of the volatile memory;
   writing the retrieved data from the first portion of the first sector to the second sector;
   aligning the written data from the first portion in the second sector based on a length of the first portion and a length of the second sector to obtain a new codeword; and
   returning, by the controller, the written data from the new codeword.

10. The method of claim 8, wherein retrieving the requested first data from the PCM is in response to determining that the requested first data is not stored in the volatile memory, and wherein the method further comprises:

in response to determining that the requested first data is stored in the volatile memory, returning the requested first data from the volatile memory.

11. The method of claim 8, wherein the first or second predetermined condition is based on one or more of:
reaching a predetermined timeout or expiration period;
reaching a predetermined capacity threshold of the volatile memory;
executing an instruction to write data from the volatile memory to the PCM;
a loss in power;
detecting a predetermined time interval or frequency for writing data from the volatile memory to the PCM;
performing a caching algorithm;
detecting a user-generated or host-configured condition;
determining that the requested first data is to be written to the volatile memory;
analyzing statistics associated with access of the requested first data;
determining that a likelihood of the requested first data to be requested or accessed is greater than a predetermined threshold; and
an observable condition associated with the requested data.

12. A computer system for mitigating write amplification in a phase change memory-based storage device, the system comprising:
a processor; and
a memory coupled to the processor and storing instructions, which when executed by the processor cause the processor to perform a method, the method comprising:
receiving, by a controller of the storage device, first data to be stored in a phase change memory (PCM) of the storage device;
writing, by the controller, the first data to a portion of a first sector of a volatile memory of the same storage device to obtain an updated portion of the first sector;
monitoring a frequency of access of second data previously written to a plurality of sectors of the volatile memory;
identifying a set of the second data including the updated portion of the first sector based on the monitored access frequency being greater than a predetermined threshold;
aggregating the identified set of the second data into a second sector of the volatile memory; and
in response to detecting a first predetermined condition, writing the aggregated data in the second sector of the volatile memory to the PCM.

13. The computer system of claim 12, wherein the first sector includes original data and original parity bits, wherein the original data includes data which has directly overwritten data previously stored in the first sector, and wherein the method further comprises, in response to detecting a second predetermined condition, writing the updated portion to the second sector of the PCM by:
comparing the data in the updated portion of the first sector with the corresponding original data to obtain a first difference;
aligning the first difference based on a length of the first difference and a length of the original data;
encoding the aligned first difference to obtain a second difference;
comparing the original parity bits with the second difference to obtain new parity bits; and
writing the updated portion and the new parity bits to the second sector of the PCM.

14. The computer system of claim 13, wherein the first or second predetermined condition is based on one or more of:
reaching a predetermined timeout or expiration period for the updated portion;
reaching a predetermined capacity threshold of the volatile memory;
executing an instruction to write data from the volatile memory to the PCM;
a loss in power; and
detecting a predetermined time interval or frequency for writing data from the volatile memory to the PCM.

15. The computer system of claim 13, wherein writing the updated portion to the second sector of the PCM is in response to determining that a length of the updated portion is less than a predetermined length.

16. The computer system of claim 12, wherein writing the first data to the first sector of the volatile memory is in response to determining that a length of the received first data is less than a predetermined length corresponding to a block size for the PCM, and wherein the method further comprises:
in response to determining that the length of the received first data is not less than the predetermined length corresponding to the block size for the PCM, writing the received first data to the PCM.

17. The computer system of claim 12, wherein identifying the second set of data is based on one or more of:
an observable condition; and
the first or second predetermined condition.

18. The computer system of claim 12, wherein prior to writing the aggregated data in the second sector of the volatile memory to the PCM, the method further comprises:
generating parity bits for the aggregated data; and
including the generated parity bits with the aggregated data.

* * * * *